(12) United States Patent
Jia et al.

(10) Patent No.: US 11,948,343 B2
(45) Date of Patent: Apr. 2, 2024

(54) IMAGE MATCHING METHOD AND APPARATUS AND NON-TRANSITORY COMPUTER-READABLE MEDIUM

(71) Applicants: Haijing Jia, Beijing (CN); Hong Yi, Beijing (CN); Liyan Liu, Beijing (CN); Wei Wang, Beijing (CN)

(72) Inventors: Haijing Jia, Beijing (CN); Hong Yi, Beijing (CN); Liyan Liu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 456 days.

(21) Appl. No.: 17/381,414

(22) Filed: Jul. 21, 2021

(65) Prior Publication Data

US 2022/0027656 A1    Jan. 27, 2022

(30) Foreign Application Priority Data

Jul. 24, 2020  (CN) .......................... 202010723161.9

(51) Int. Cl.
*G06T 7/55* (2017.01)
*G06T 7/11* (2017.01)
*G06V 10/44* (2022.01)

(52) U.S. Cl.
CPC .............. *G06V 10/443* (2022.01); *G06T 7/11* (2017.01); *G06T 7/55* (2017.01)

(58) Field of Classification Search
CPC .... G06V 10/443; G06V 20/36; G06V 20/647; G06T 7/11; G06T 7/55; G06T 7/33;

(Continued)

(56) References Cited

U.S. PATENT DOCUMENTS

| 2009/0237396 A1 | 9/2009 | Venezia et al. |
| 2019/0200003 A1* | 6/2019 | Givon ..................... G06T 7/246 |
| 2020/0074668 A1 | 3/2020 | Stenger et al. |

FOREIGN PATENT DOCUMENTS

CN    111145352    5/2020

OTHER PUBLICATIONS

Sun Cheng et al: "HorizonNet: Learning Room Layout With 1D Representation and Pano Stretch Data Augmentation", 2019 IEEE/CVF Conference On Computer Vision and Pattern Recognition(CVPR), IEEE, Jun. 15, 2019, pp. 1047-1056, XP033686879, DOI: 10.1109/CVPR.2019.00114 (retrieved on Jan. 8, 2020).

(Continued)

*Primary Examiner* — Stephen P Coleman
(74) *Attorney, Agent, or Firm* — IPUSA, PLLC (57) ABSTRACT

Disclosed are an image matching method and apparatus. The image matching method is inclusive of steps of obtaining a panoramic image of at least one subspace in a 3D space and a 2D image of the 3D space; acquiring a 2D image of the at least one subspace in the 3D space; performing 3D reconstruction on the panoramic image of the at least one subspace, and procuring a projection image corresponding to the panoramic image of the at least one subspace; and attaining a matching relationship between the panoramic image of the at least one subspace and the 2D image of the at least one subspace, and establishing an association relationship between the panoramic image of the at least one subspace and the 2D image of the at least one subspace between which the matching relationship has been generated.

18 Claims, 6 Drawing Sheets

(58) Field of Classification Search
CPC ............. G06T 2207/20084; G06T 7/75; G06T 3/0031; G06T 3/4038; G06T 7/32; G06T 17/00
USPC ......................................................... 382/218
See application file for complete search history.

(56) References Cited

OTHER PUBLICATIONS

Extended European Search Report for 21186753.6 dated Dec. 17, 2021.

* cited by examiner

IMAGE MATCHING METHOD AND APPARATUS AND NON-TRANSITORY COMPUTER-READABLE MEDIUM

BACKGROUND OF THE DISCLOSURE

1. Field of the Disclosure

The present disclosure relates to the field of image processing, and specifically, an image matching method and apparatus as well as a non-transitory computer-readable medium.

2. Description of the Related Art

Virtual roaming is an important branch of virtual reality (VR) technology, and related to various industries like construction, tourism, games, aerospace, medicine, etc. By the combination of virtual scene creation technology and virtual roaming technology, users can autonomously roam in three-dimensional (3D) scenes such as buildings, cities, games, and the like, so that the users are able to have an intuitive experience of these kinds of roaming scenes.

In the interactive process of virtual roaming, it is necessary to build the subspace matching relationship between a 3D scene where users roam and a two dimensional (2D) image describing the structure of the 3D scene, so as to guide the users to autonomously control the subspaces where they want to roam. However, generally speaking, it is possible to manually carry out subspace matching with respect to a 3D scene and a 2D image, so that the association relationship between the respective subspaces in the 3D scene and the 2D image can be established. For example, mutual matching and jump between the subspaces in the 3D scene and the 2D image may be realized by means of manually generating navigation points.

It can be seen from the above that the method of manually achieving subspace matching between the 3D scene and the 2D image is time-consuming and labor-intensive. As such, there is a need to construct a method and apparatus that can automatically match the subspaces of a 3D scene and a 2D image.

SUMMARY OF THE DISCLOSURE

The present disclosure aims to provide at least an image matching method and apparatus for solving the above-described technical problem.

According to a first aspect of the present disclosure, an image matching method is provided that may include steps of obtaining a panoramic image of at least one subspace in a 3D space and a 2D image of the 3D space; acquiring, based on the 2D image of the 3D space, a 2D image of the at least one subspace in the 3D space, wherein, the 3D space is composed of the at least one subspace, and when the 3D space consists of a plurality of subspaces, these subspaces do not overlap each other; performing 3D reconstruction on the panoramic image of the at least one subspace, and procuring a projection image corresponding to the panoramic image of the at least one subspace; and attaining, based on the projection image of the at least one subspace and the 2D image of the at least one subspace, a matching relationship between the panoramic image of the at least one subspace and the 2D image of the at least one subspace, and establishing an association relationship between the panoramic image of the at least one subspace and the 2D image of the at least one subspace between which the matching relationship has been generated.

According to a second aspect of the present disclosure, an image matching apparatus is provided that may contain an image obtainment part configured to obtain a panoramic image of at least one subspace in a 3D space and a 2D image of the 3D space, wherein, the 3D space is composed of the at least one subspace, and when the 3D space consists of a plurality of subspaces, these subspaces do not overlap each other; a subspace acquisition part configured to acquire, based on the 2D image of the 3D space, a 2D image of the at least one subspace in the 3D space; a reconstruction part configured to perform 3D reconstruction on the panoramic image of the at least one subspace, and procure a projection image corresponding to the panoramic image of the at least one subspace; and a matching part configured to attain, based on the projection image of the at least one subspace and the 2D image of the at least one subspace, a matching relationship between the panoramic image of the at least one subspace and the 2D image of the at least one subspace, and establish an association relationship between the panoramic image of the at least one subspace and the 2D image of the at least one subspace between which the matching relationship has been generated.

According to a third aspect of the present disclosure, an image matching apparatus is provided that may involve a processor and a storage connected to the processor. The storage may store computer-executable instructions that, when executed by the processor, can make the processor to implement the image matching method.

According to a fourth aspect of the present disclosure, a computer-executable program and a non-transitory computer-readable medium are provided. The computer-executable program may cause a computer to conduct the image matching method. The non-transitory computer-readable medium can store computer-executable instructions (i.e., the computer-executable program) for execution by a computer having a processor. The computer-executable instructions, when executed by the processor, may render the processor to perform the image matching method.

On the basis of the image matching method and apparatus, by carrying out projection in respect of the panoramic image of at least one subspace in a 3D space to obtain a projection image, and conducting matching between the projection image and the 2D image of the at least one subspace, it is possible to acquire the matching relationship between the panoramic image of the at least one subspace and the 2D image of the at least one subspace, and construct the association relationship between the two on the grounds of their matching relationship. Such image matching method and apparatus can reduce costs and effectively improve image matching efficiency while ensuring the accuracy of image matching.

DETAILED DESCRIPTION OF THE PREFERRED EMBODIMENTS

In order to let a person skilled in the art better understand the present disclosure, hereinafter, the embodiments of the present disclosure are concretely described with reference to the drawings. However, it should be noted that the same symbols, that are in the specification and the drawings, stand for constructional elements having basically the same function and structure, and the repetition of the explanations to the constructional elements is omitted.

First Embodiment

Figure 1:
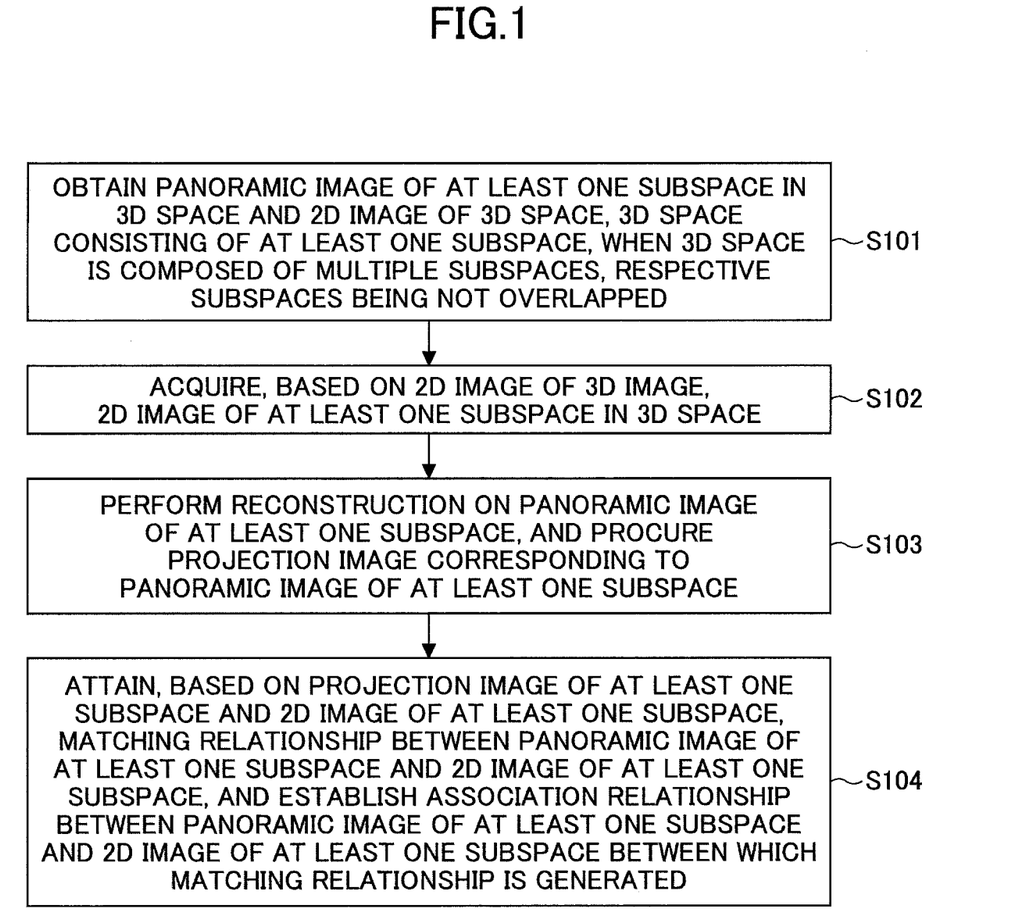
FIG. 1 is a flowchart of an image matching method according to a first embodiment of the present disclosure.

FIG. 1 is a flowchart of an image matching method according to this embodiment. As shown in FIG. 1, the image matching method is inclusive of STEPS S101 to S104.

In STEP S101, it is possible to obtain the panoramic image of at least one subspace in a 3D space as well as the 2D image of the 3D space. Here, the 3D space is composed of the at least one subspace. When the 3D space consists of a plurality of subspaces, these subspaces do not overlap each other.

The panoramic image of the at least one subspace in the 3D space may be obtained by way of various approaches in this step. For example, a panoramic camera (e.g., a fish-eye camera or two-lens camera) can be used to obtain the panoramic image (e.g., an equirectangular projection) of each subspace among the at least one subspace. Again, for instance, it is also possible to utilize a common camera to attain multiple perspective images of each subspace among the at least one subspace, and stitch the multiple perspective images, so as to obtain the panoramic image of the same subspace.

Here, the 3D space may be composed of one or more subspaces, and these subspaces can be acquired by carrying out segmentation with respect to the 3D space using various approaches. Furthermore, in a case where the 3D space consists of a plurality of subspaces, the respective subspaces may be mutually non-overlapping and non-nesting. As an example, when the 3D space is an indoor space of a building, the indoor space can be divided into a plurality of independent rooms by objects such as walls, doors, windows, etc. therein to serve as subspaces.

Additionally, in this step, the 2D image of the 3D space may also be obtained. The 2D image of the 3D image is adopted to describe the planar layout of each subspace in the 3D space. As an illustration, when the 3D space is an indoor space of a building, the 2D image of the 3D space may be a 2D floor plan describing the planar layout of each room in the indoors space, for example.

STEP S102 is acquiring the 2D image of the at least one subspace in the 3D space on the basis of the 2D image of the 3D space.

In this step, it is possible to conduct segmentation in respect to the 2D image of the 3D space, so as to obtain the 2D image of each subspace in the 3D space. As an example, a pretrained 2D image recognition model may be utilized to carry out semantic recognition in respect to each pixel point in the 2D image of the 3D space, so that the semantic information of each pixel point can be procured. Subsequently, it is possible to perform segmentation on the 2D image of the 3D space based on the semantic information of each pixel point in the 2D image of the 3D space, so as to attain the 2D image of each subspace. Optionally, the pretrained 2D image recognition model for procuring the semantic information of each pixel point in the 2D image of the 3D space may be a deep neural network model.

For instance, in a case where the 2D image of the 3D space is the 2D floor plan of an indoor space as set forth above, a deep neural network based Deep Floor Plan model may be employed to carry out semantic recognition with respect to the 2D floor plan of the indoor space, so as to identify the semantic information of the pixel points respectively belonging to the walls, windows, doors, rooms (e.g., a bedroom(s), kitchen(s), and bathroom(s)), etc. in the 2D floor plan of the indoor space.

Next, segmentation is conducted on the 2D floor plan of the indoor space according to the semantic information of the respective pixel points, so as to attain the 2D floor plan of each subspace (i.e., each room). In this segmentation process, optionally, area expansion (also called region growing) may be adopted that examines the neighboring pixels of a predetermined seed point (e.g., a pixel point whose semantic information indicates a certain type of room) and adds the neighboring pixels having the same semantic information to the corresponding region until encountering a pixel point with different semantic information (e.g., a pixel point whose semantic information is indicative of a wall, door, or window). Moreover, in this case, the deep neural network based Deep Floor Plan model may be pretrained by making use of a known picture set of 2D floor plans and the related semantic labels.

In STEP S103, 3D reconstruction is performed on the panoramic image of the at least one subspace, and a projection image corresponding to the panoramic image of the at least one subspace is procured.

It is possible to acquire, based on the panoramic image of the at least one subspace, the spatial features of at least one object forming the at least one subspace, and, based on the acquired spatial features of the at least one object, conduct 3D reconstruction. Optionally, the spatial features of the at least one object may be inclusive of the geometric shape and spatial coordinates of the object, the relative geometric relationship between any two objects, etc. After the spatial features of the at least one object is acquired, 3D reconstruction can be performed on the panoramic image of the at least one subspace. Preferably, the model for 3D reconstruction may be a deep neural network model.

In an example, when the 3D space is an indoor space of a building, the at least one subspace in the 3D space may be a room. The at least one object forming the at least one subspace may include the walls, floor, ceiling, and the like forming the room. The spatial features of the at least one object may contain the spatial coordinates of the walls, floor, ceiling, and the like forming the room, the geometric relationships (vertical or parallel) between two walls, a wall and the floor, a wall and the ceiling, etc., and the boundary positions at their junctions.

After the spatial features of the at least one object are acquired, it is possible to carry out 3D reconstruction with respect to the room, so as to procure a 3D reconstruction model of the room. Here, a deep neural network based HorizonNet model can be utilized to perform 3D reconstruction, and optionally, it is possible to pretrain this model by taking advantage of an existing panoramic image set of rooms and the relevant layout labels.

Subsequently, after the 3D reconstruction process is carried out, it is possible to perform detection and positioning on at least one target in the panoramic image of the at least one subspace, and attain, based on the 3D reconstruction result of the panoramic image of the at least one subspace as well as the detection and positioning result of the at least one target in the panoramic image, a projection image of the at least one subspace, on the plane at which the 2D image of the 3D space is located.

Optionally, the detection and positioning result of the at least one target in the panoramic image of the at least one subspace may contain the geometric shape, spatial coordinates, and the like of the at least one target. After the 3D reconstruction result as well as the detection and positioning result of the at least one target are attained, it is possible to project the 3D reconstruction model of the panoramic image of the at least one subspace onto a plane (also called a projection plane). The projection plane may be the plane where the 2D image of the 3D space is located, or another plane parallel to the plane. Moreover, it is also possible to mark the information such as the shape, position, etc. of the at least one target detected in the projection image. Preferably, the model for target detection may be a deep neural network model.

As an illustration, in case where the 3D space is an indoor space of a building, the at least one subspace in the 3D space may be a room, and the at least one target in the panoramic image of the at least one subspace may be a door, window, closet, and so on in the room, thereby being able to procure, by detecting the door, window, closet and the like in the room, a detection and positioning result including the geometric shapes, spatial coordinates, etc. of them. After this type of result is acquired, the 3D reconstruction model of the panoramic image of the room can be projected onto the ground, for example, so as to attain the projection image of the room, and mark the positions of the door, window, closet, and the like in the projection image. Here, a deep neural network based YOLOv3 model may be employed in the target detection process, and optionally, it is possible to pretrain this model by making use of a known panoramic image set of rooms and the relating target detection labels.

Referring again to FIG. 1; in STEP S104, it is possible to attain, based on the projection image of the at least one subspace and the 2D image of the at least one subspace, the matching relationship between the panoramic image of the at least one subspace and the 2D image of the at least one subspace, and establish the association relationship between the panoramic image of the at least one subspace and the 2D image of the at least one subspace between which the matching relationship has been generated.

Optionally, the matching relationship between the projection image of the at least one subspace and the 2D image of the at least one subspace may be attained on the basis of the layout of objects and/or targets in the projection image of the at least one subspace and the 2D image of the at least one subspace. Then, based on the matching relationship between the projection image of the at least one subspace and the 2D image of the at least one subspace, the matching relationship between the panoramic image of the at least one subspace and the 2D image of the at least one subspace can be procured.

For example, when the at least one subspace is a room, it is possible to determine the matching relationship between the panoramic image of the at least one subspace and the 2D image of the at least one subspace on the basis of various factors such as the shapes, numbers, positions, geometric relationships, and so on of the objects like the walls, floor, ceiling, etc. forming the room. Furthermore, it is also possible to determine the matching relationship between the panoramic image of the at least one subspace and the 2D image of the at least one subspace based on the shapes, numbers, positions, geometric relationships, etc. of the targets such as the doors, windows, closets, and the like in the room, for example.

As an option, shape matching may be performed on the projection image of the at least one subspace and the 2D image of the at least one subspace, and the matching relationship between the projection image of the at least one subspace and the 2D image of the at least one subspace can be established on the basis of the shape matching result. Next, based on the matching relationship between the projection image of the at least one subspace and the 2D image of the at least one subspace, it is possible to attain the matching relationship between the panoramic image of the at least one image and the 2D image of the at least one image.

After the matching relationship between the panoramic image of the at least one subspace and the 2D image of the at least one subspace is attained, the link between the panoramic image of the at least one subspace and the 2D image of the at least one subspace can be built, so as to create the association relationship between the two. As such, by using various ways such as clicking, touching, and the like, it is possible to achieve jump display between the panoramic image of the at least one subspace and the 2D image of the at least one subspace.

In this embodiment, after the panoramic image of the at least one subspace in the 3D space and the 2D image of the 3D space are obtained, the image matching method may further include a step of acquiring first label information corresponding to the panoramic image of the at least one subspace and a step of attaining second label information corresponding to the 2D image of the at least one subspace in the 3D space.

Optionally, it is possible to carry out classification with respect to the panoramic image of the at least one subspace in the 3D space, and acquire, based on the classification result, the first label information corresponding to the panoramic image of the at least one subspace. For instance, a deep neural network model can be utilized to conduct the classification process in regard to the panoramic image of the at least one subspace. Here, the deep neural network model may be a deep neural network based VGG16 model. In a case where the at least one subspace is a room, a known panoramic image set of various types of rooms and the related room type labels are able to be adopted to perform classification on the room, so as to acquire the classification result.

Moreover, as an option, it is also possible to conduct classification with respect to the 2D image of the at least one subspace in the 3D space, and attain the second label information corresponding to the 2D image of the at least one subspace on the basis of the classification result. For example, the second label information corresponding to the 2D image of the at least one subspace may be procured by taking advantage of the above-described semantic recognition result regarding each pixel point in the 2D image of the 3D space.

After acquiring the first label information and the second label information, it is possible to attain, based on the first label information and the second label information, the matching relationship between the panoramic image of the at least one subspace and the 2D image of the at least one subspace.

For instance, it is possible to determine, by comparing the first label information and the second label information, whether the panoramic image of the at least one subspace matches the 2D image of the at least one subspace. Optionally, when the first label information is the same as the second label information, it may be regarded that the panoramic image of the at least one subspace matches the 2D image of the at least one subspace (hereinafter, this kind of matching is also called rough matching). Alternatively, when the first label information is similar to the second label information, or the two belong to the same class, it may be considered that the panoramic image of the at least one subspace matches the 2D image of the at least one subspace. Here it should be noted that the present disclosure is not limited to this; that is, any other proper approach can be adopted to compare the first label information and the second label information as needed.

Next, after the rough matching process is conducted with respect to the panoramic image of the at least one subspace and the 2D image of the at least one subspace, it is possible to determine, based on the rough matching result, whether STEPS S103 and S104 are carried out.

For instance, if it is determined based on the rough matching result that the matching relationship between the panoramic image of a specific subspace and the 2D image of the at least one subspace cannot be created, then STEP S103 is executed, i.e., 3D reconstruction is performed on the panoramic image of the specific subspace, and the projection image of the panoramic image of the specific subspace is acquired. Subsequently, it is possible to implement STEP S104 in regard to the projection image of the panoramic image of the at least one subspace and the 2D image of the at least one subspace, the matching relationship between the panoramic image of the at least one subspace and the 2D image of the at least one subspace being not able to be generated.

In an example, when the first label information and/or the second label information corresponding to the panoramic image of a specific subspace and/or the 2D image of the specific subspace are incorrectly detected, STEP S103 and S104 may be carried out with respect to the panoramic image of the specific subspace and 2D image of the specific subspace between which the matching relationship cannot be created due to the mistaken first and/or second label information.

In another example, although the matching relationship between the first label information and the second label can be established, at least one of the first and second label information corresponds to a plurality of panoramic images or 2D images of the at least one subspace. In such a case, there is not a one-to-one correspondence between the panoramic image of the at least one subspace and the 2D image of the at least one subspace, thereby being not capable of establishing the matching relationship between the panoramic image of the at least one subspace and the 2D image of the at least one subspace, so that STEPS S103 and S104 may also be conducted.

By first comparing the first label information and the second label information in the image matching method according to this embodiment, it is possible to reduce the resource occupation of the follow-on 3D reconstruction and projection process, save the image matching time, and improve the image matching efficiency.

Moreover, in a case where STEP S104 is conducted when there does not exist a one-to-one correspondence between the panoramic image of the at least one subspace and the 2D image of the at least one subspace, it is also possible to first let the projection image of the at least one subspace and the 2D image of the at least one subspace corresponding to the first label information and the second label information being able to construct a matching relationship, having the same type or similar types or belonging to the same class be divided into groups, and in the same group, regarding at least one subspace for which a matching relationship cannot be created in the rough matching process, generate the matching relationship between the projection image of the at least one subspace and the 2D image of the at least one subspace, so as to further ameliorate the image matching efficiency and accuracy.

Here, it should be pointed out that the foregoing description of the image matching method according to this embodiment is only an example. In a specific implementation process, the steps of the image matching method can be arranged in any manner, or two or more steps thereof are also able to be performed at the same time. Additionally, the label information attainment process and the image matching process in regard to the panoramic image of the at least one subspace and the 2D image of the at least one subspace can be conducted independently or executed after carrying out image matching by 3D reconstruction and projection.

For example, the image matching method according to this embodiment may include only the following steps (also called a rough matching process), namely, obtaining the panoramic image of at least one subspace in a 3D space and the 2D image of the 3D space (here, the 3D space consists of the at least one subspace, and when the 3D space is composed of a plurality of subspaces, the respective subspaces do not overlap each other); attaining firs label information corresponding to the panoramic image of the at least one subspace; acquiring second label information corresponding to the 2D image of the at least one subspace; and procuring, based on the first and second label information, the matching relationship between the panoramic image of the at least one subspace and the 2D image of the at least one subspace. Of course, all the variations, modifications, and optimizations of the steps in the image matching method according to this embodiment are included in the technical scope limited by the embodiments of the present disclosure.

By taking advantage of the image matching method in accordance with this embodiment, it is possible to perform projection on the panoramic image of at least one subspace in a 3D space so as to obtain a projection image, conduct matching with respect to the projection image of the at least one subspace and the 2D image of the at least one subspace so as to attain the matching relationship between the panoramic image of the at least one subspace and the 2D image of the at least one subspace, and construct, based on the matching relationship between the panoramic image of the at least one subspace and the 2D image of the at least one subspace, the association relationship between the two. Such an image matching method can reduce costs and effectively improve image matching efficiency while ensuring the accuracy of image matching.

In what follows, an example of the image matching method in accordance with this embodiment is illustrated. In this example, the 3D space is an indoor space of a building, the subspaces in the 3D space are the respective rooms in the indoor space, and the 2D image of the 3D space may be a 2D floor plan including the respective rooms in the building.

Figure 2:
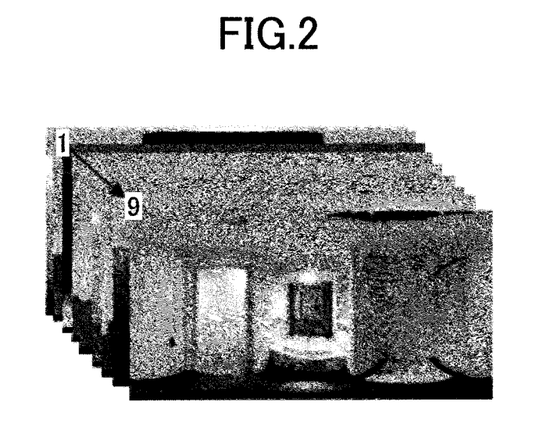
FIG. 2 illustrates the panoramic images corresponding to a plurality of rooms in a 3D space.
Figure 3:
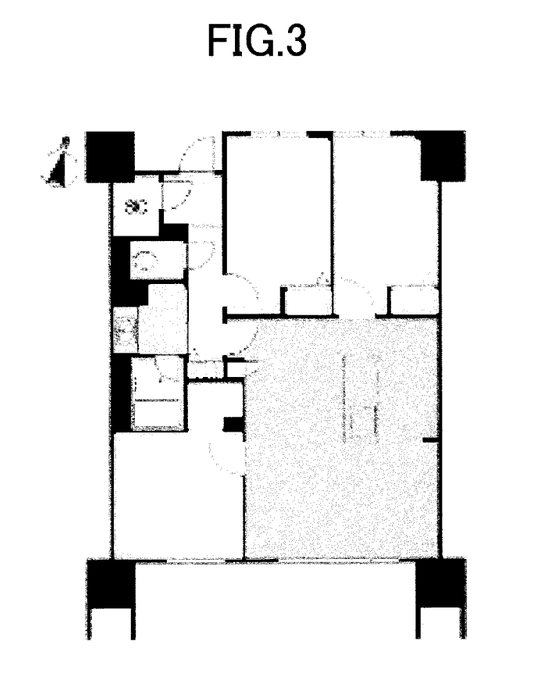
FIG. 3 shows a 2D floor plan.

In this example, first it is possible to obtain the panoramic image of at least one room in the 3D space (i.e., the indoor space). FIG. 2 illustrates the panoramic images corresponding to a plurality of rooms in the 3D space. As presented in FIG. 2, the panoramic images of the respective rooms may include the panoramic images corresponding to a living room, a kitchen, a toilet, bedrooms, and the like having different room types. Then it is also possible to acquire the 2D floor plan showing the planar layout of the 3D space. FIG. 3 is the 2D floor plan of the 3D space, in which the geometric shapes, layout details, positional relationships, and so on of the respective rooms are presented.

Figure 4:
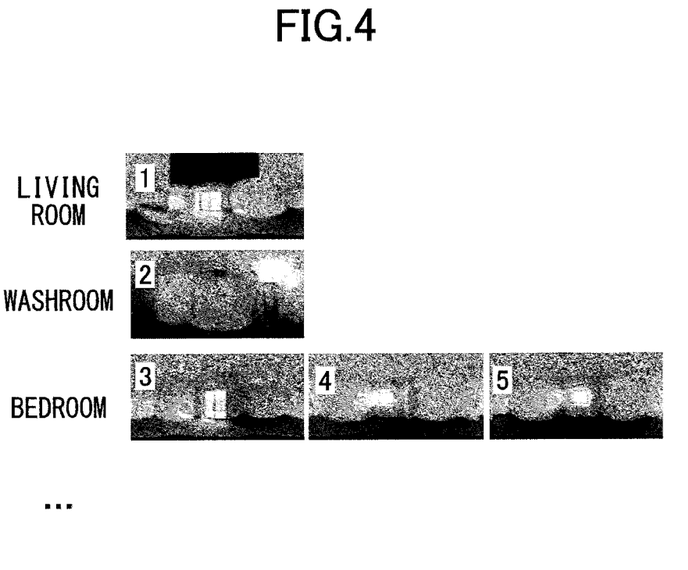
FIG. 4 is a schematic diagram of panoramic image classification of the respective rooms having different types of first label information.

After the panoramic images of the respective rooms in the 3D space and the 2D floor plan of the 3D space are obtained, it is possible to attain the first label information corresponding to the panoramic images and the second label information corresponding to the 2D floor plans of the multiple room. Specifically, after obtaining the panoramic images of the respective rooms, a deep neural network based VGG16 model may be employed to carry out classification with respect to the panoramic images, so as to procure the panoramic images corresponding to different room types. Here, the room types may be the first label information corresponding to the panoramic images. FIG. 4 is a schematic diagram of panoramic image classification of the respective rooms having different types of first label information.

Figure 5:
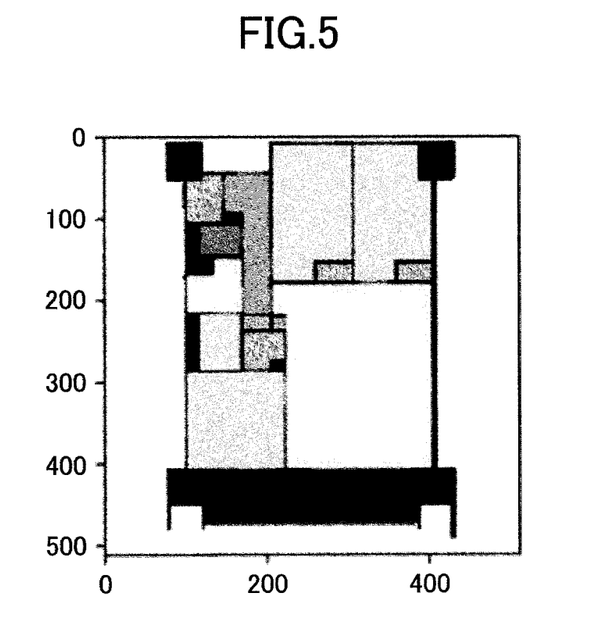
FIG. 5 shows different semantic type recognition results of the respective pixels in the 2D floor plan.

In addition, after the 2D floor plan of the indoor space shown in FIG. 3 is acquired, a pretrained deep neural network based Deep Floor Plan model may be utilized to conduct semantic recognition pertaining to the 2D floor plan, so as to acquire the semantic information of each pixel point in the 2D floor plan. FIG. 5 shows different semantic type recognition results of the respective pixel points in the 2D floor plan of the indoor space. As presented in FIG. 5, it is possible to recognize the semantic information of the rooms, walls, doors, and windows having different types in the 2D floor plan of the indoor space, and carry out, based on the semantic information, classification in regard to the respective pixel points, so as to acquire the 2D image of at least one room.

Figure 6:
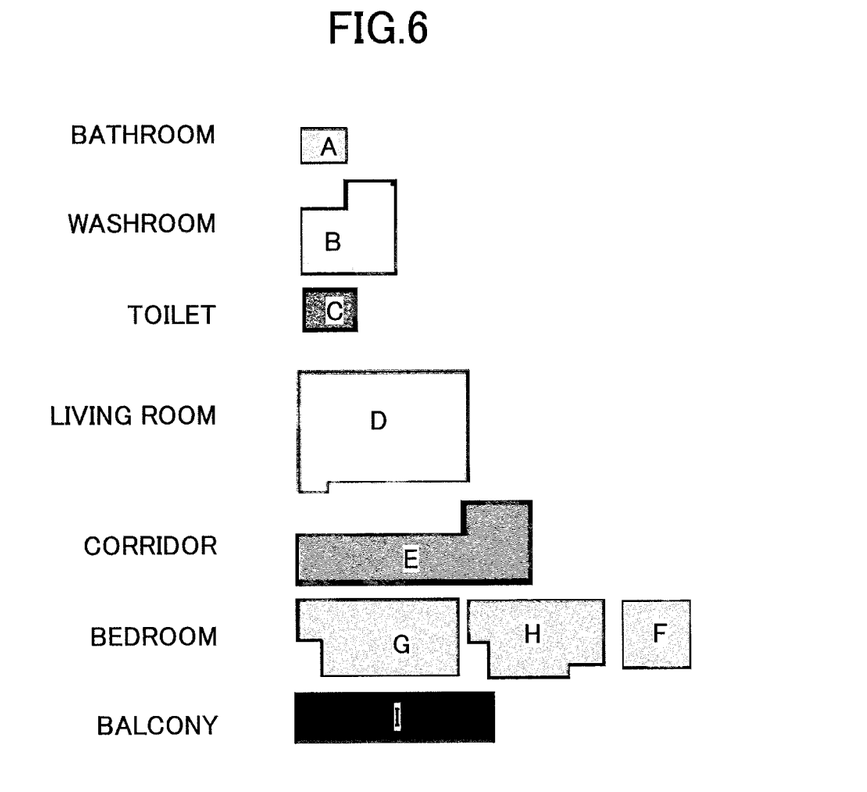
FIG. 6 illustrates the 2D image of each room obtained by performing segmentation on the 2D floor plan as well as the room type to which the 2D image of the same room corresponds.

Moreover, on the basis of the above, it is also possible to further attain the room type corresponding to the 2D image of each room. FIG. 6 illustrates the 2D image of each room obtained by performing segmentation on the 2D floor plan of the indoor space, in which the 2D image of each room correspond to its room type, i.e., the second label information such as a living room, bedroom, veranda, washroom, and so on.

After the panoramic image of each room and its corresponding first label information presented in FIG. 4 as well as the 2D floor plan of each room and its corresponding second label information shown in FIG. 6 are acquired, it is possible to perform matching on the panoramic image of each room and the 2D floor plan of each room on the basis of the corresponding first label information and second label information.

Optionally, when the first label information is the same as the second label information, i.e., when the room type corresponding to the panoramic image of a room is the same as the room type corresponding to the 2D floor plan of a room, the panoramic image and 2D floor plan of the two respective rooms can be regarded as having a matching relationship.

In the current stage, it is possible to match the corresponding panoramic image and 2D floor plan whose first label information and second label information are the same and respectively have only one. For instance, only when the first label information and the second label information indicate a living room and have only one, respectively, the matching relationship between the panoramic image of the living room and the 2D floor plane of the living room corresponding to the first label information and the second label information can be established. In the same way, it is also possible to carry out matching with respect to the toilet, kitchen, balcony, and the like, respectively. However, in a case where the second label information is indictive of a bedroom, and there are two or more bedrooms (e.g., three bedrooms in FIG. 6), the matching process may not be conducted in this stage.

After the matching process using the first and second label information is accomplished, if it is impossible to acquire, based on the first and second label information, the matching relationship between the panoramic image of the at least one room and the 2D image of the at least one room, then 3D reconstruction is carried out on the basis of the panoramic image for which the matching relationship cannot be established, and the corresponding projection image is attained.

Figure 7:
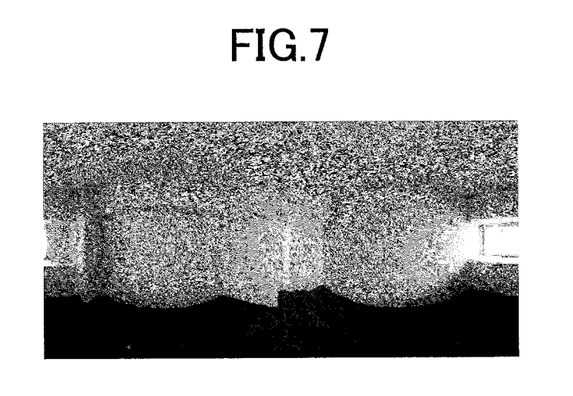
FIG. 7 presents the panoramic image of a bedroom that cannot be matched successfully.
Figure 8:
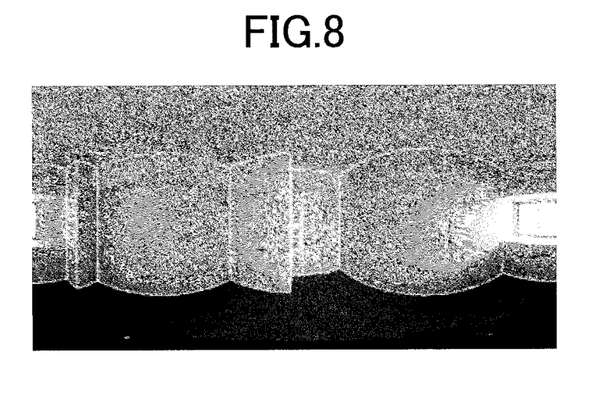
FIG. 8 is a schematic diagram of 3D reconstruction carried out with respect to the panoramic image presented in FIG. 7.

For example, it is possible to conduct 3D reconstruction as well as target detection and positioning pertaining to a panoramic image whose room type (i.e., the first label information) is a bedroom. As an illustration, FIG. 7 presents the panoramic image of a bedroom that cannot be matched successfully. FIG. 8 is a schematic diagram of 3D reconstruction carried out with respect to the panoramic image shown in FIG. 7. In this case, it is possible to utilize a deep neural network based HorizonNet model to conduct 3D reconstruction, so as to procure the boundary positions at the junctions between walls, walls and a floor, and walls and a ceiling, as indicted by the white lines in FIG. 8.

Figure 9:
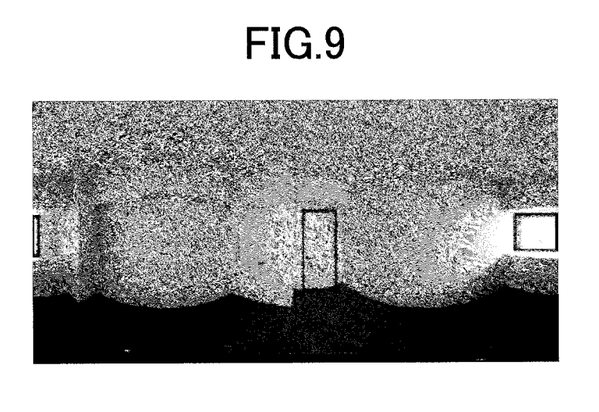
FIG. 9 shows a schematic diagram of target detection and positioning conducted on the panoramic image presented in FIG. 7.

Of course, in the 3D reconstruction process, other geometric spatial features of these objects forming the bedroom can also be obtained. In addition, FIG. 9 shows a schematic diagram of target detection and positioning conducted on the panoramic image presented in FIG. 7. Here, a deep neural network based YOLOv3 model is employed to conduct door and window detection in regard to the panoramic image of the bedroom illustrated in FIG. 7, so as to acquire the geometric shapes and positions of doors and windows, as indicated by the black rectangles in FIG. 9.

Figure 10:
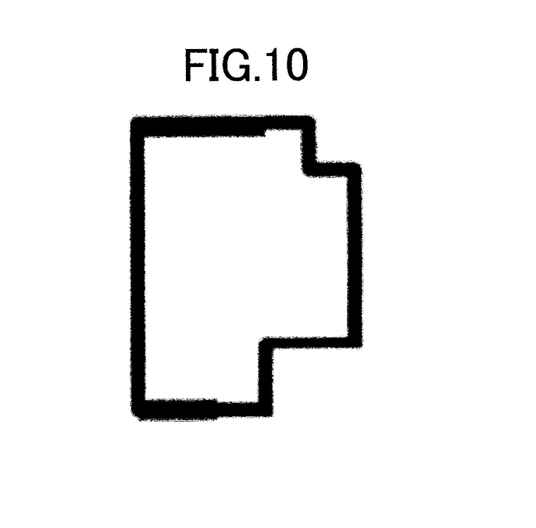
FIG. 10 illustrates a projection image acquired by carrying out projection in regard to the panoramic image presented in FIG. 7.

After finishing the 3D reconstruction as well as the target detection and positioning process, it is possible to project, based on the attained results, the panoramic image of the bedroom onto the ground, so as to procure a projection image as shown in FIG. 10. Here, it should be noted that FIG. 10 illustrates a projection image acquired by carrying out projection in regard to the panoramic image presented in FIG. 7. It can be seen from FIG. 10 that the geometric shape and size of the bedroom corresponding to the panoramic image of the bedroom are presented, and the concrete positions of the door and window in the bedroom are further indicated using thick black lines.

Eventually, on the basis of the projection image of each room and the 2D floor plan of each room acquired above, by comparing the layouts of objects and/or targets and/or conducting shape recognition of the two, it is possible to generate the matching relationship between the projection image of at least one room and the 2D floor plan of the at least one room, and further create the matching relationship between the panoramic image of the at least one room and the 2D floor plan of the at least one room.

Optionally, at this time, the first label information and the second label information corresponding to the panoramic image of each room and the 2D floor plan (i.e., the 2D images) of each room can be utilized to perform classification on these images, and the matching relationship cab be produced on the basis of the classification result. For example, it is possible to make the panoramic images whose corresponding first label information indicates a bedroom and the 2D floor plan whose corresponding second label information is also indicative of the bedroom belong to one class, and carry out matching between the panoramic images and the 2D floors plans of bedrooms in this class.

Moreover, it is also possible to build the link between the panoramic image of at least one room and 2D image of the at least one room between which the matching relationship is generated. As a result, by using various ways such as clicking, touching, and the like, it is possible to realize mutual jump display between the panoramic image of the at least one room and the 2D image of the corresponding room.

Second Embodiment

Figure 11:
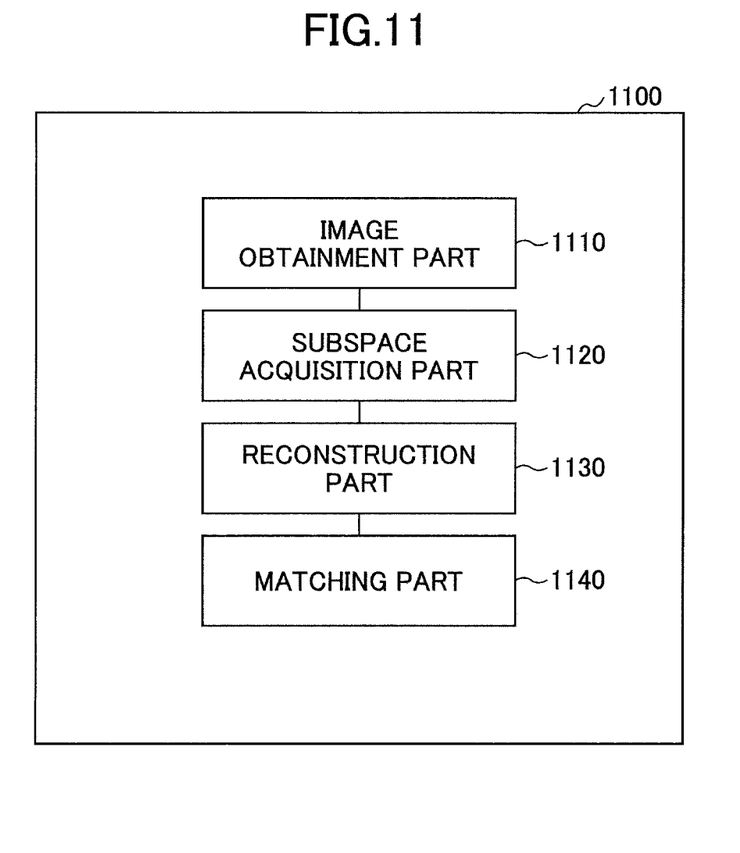
FIG. 11 is a block diagram of an image matching apparatus in accordance with a second embodiment of the present disclosure.

This embodiment provides an image matching apparatus. FIG. 11 is a block diagram of an image matching apparatus 1100 in accordance with this embodiment. As presented in FIG. 11, the image matching apparatus 1100 is inclusive of an image obtainment part 1110, a subspace acquisition part 1120, a reconstruction part 1130, and a matching part 1140. Of course, the image matching apparatus 1100 may also include other parts as needed.

The image matching apparatus 1100 may be configured to perform the image matching method according to the first embodiment. Particularly, the image obtainment part 1110, the subspace acquisition part 1120, the reconstruction part 1130, and the matching part 1140 may be configured to conduct STEPS S101 to S104 of FIG. 1, respectively.

Also, it should be pointed out that for the reason that STEPS S101 to S104 of FIG. 1 have been minutely described in the first embodiment, the details of them are omitted in this embodiment.

Furthermore, the image matching apparatus 1100 may also contain a rough matching part (not shown in the drawings) that can be configured to carry out the rough matching process as described in the first embodiment. Alternatively, the image matching apparatus 1100 can include only the rough matching part.

By making use of the image matching apparatus in accordance with this embodiment, it is possible to carry out projection with respect to the panoramic image of at least one subspace in a 3D space so as to obtain a projection image, perform matching on the projection image of the at least one subspace and the 2D image of the at least one subspace so as to attain the matching relationship between the panoramic image of the at least one subspace and the 2D image of the at least one subspace, and construct, based on the matching relationship between the panoramic image of the at least one subspace and the 2D image of the at least one subspace, the association relationship between the two. This kind of image matching apparatus is capable of reducing costs and effectively improving image matching efficiency while ensuring the accuracy of image matching.

Third Embodiment

In this embodiment, according to one aspect, another image matching apparatus is provided that may be configured to conduct the image matching method in accordance with the first embodiment.

Figure 12:
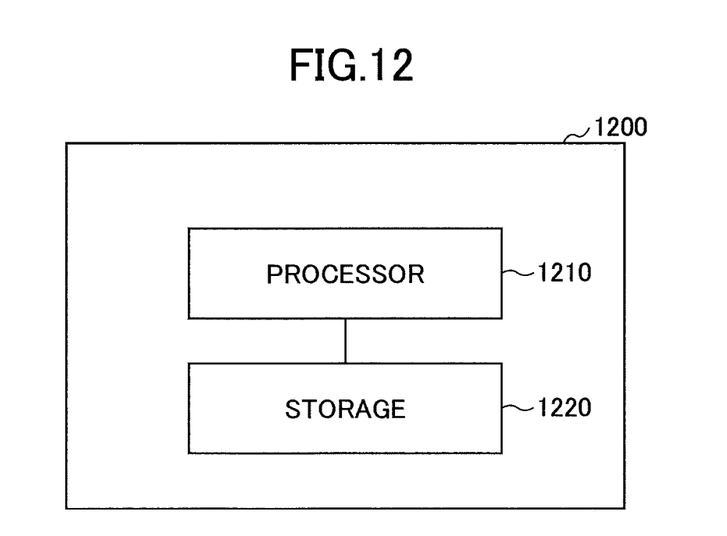
FIG. 12 presents a block diagram of another matching apparatus according to a third embodiment of the present disclosure.

FIG. 12 is a block diagram of an image matching apparatus 1200 according to this embodiment. As presented in FIG. 12, the image matching apparatus 1200 may contain a processor 1210 and a storage 1220 connected to the processor 1210. Of course, the image matching apparatus 1200 may also include other parts as needed.

The processor 1210 may be used to execute a computer program (i.e., computer-executable instructions) stored in the storage 1220 so as to fulfill the image matching method in accordance with the first embodiment. The processor 1210 may adopt any one of the conventional processors in the related art.

The storage 1220 may be utilized to store the computer program and the relating data as well as the intermediate results generated when the processor 1210 conducts the computer program, for example. The storage 1220 may use any one of the existing storages in the related art.

Moreover, according to another aspect, a computer-executable program and a non-transitory computer-readable medium are provided. The computer-executable program may cause a computer to perform the image matching method according to the first embodiment. The non-transitory computer-readable medium may store computer-executable instructions (i.e., the computer-executable program) for execution by a computer involving a processor. The computer-executable instructions may, when executed by the processor, render the processor to conduct the image matching method in accordance with the first embodiment.

Here it should be noted that because the steps involved in the image matching method have been concretely described in the first embodiment, the details of the steps are omitted in this embodiment for the sake of convenience.

Moreover, the above embodiments are just exemplary ones, and the specific structure and operation of them may not be used for limiting the present disclosure.

Furthermore, the embodiments of the present disclosure may be implemented in any convenient form, for example, using dedicated hardware or a mixture of dedicated hardware and software. The embodiments of the present disclosure may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G, 4G, or 5G-compliant phone) and so on. Since the embodiments of the present disclosure may be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 202010723161.9 filed on Jul. 24, 2020, the entire contents of which are hereby incorporated by reference.

What is claimed is:

1. An image matching method comprising:
    obtaining a panoramic image of at least one subspace in a 3D space and a 2D image of the 3D space, wherein, the 3D space consists of the at least one subspace, and when the 3D space is composed of a plurality of subspaces, the respective subspaces are not mutually overlapped;
    acquiring, based on the 2D image of the 3D space, a 2D image of the at least one subspace in the 3D space;
    performing 3D reconstruction on the panoramic image of the at least one subspace, and procuring a projection image corresponding to the panoramic image of the at least one subspace; and
    attaining, based on the projection image of the at least one subspace and the 2D image of the at least one subspace, a matching relationship between the panoramic image of the at least one subspace and the 2D image of the at least one subspace, and establishing an association relationship between the panoramic image of the at least one subspace and the 2D image of the at least one subspace between which the matching relationship is generated.

2. The image matching method in accordance with claim 1, further comprising:
    acquiring first label information corresponding to the panoramic image of the at least one subspace in the 3D space;
    acquiring second label information corresponding to the 2D image of the at least one subspace in the 3D space; and
    attaining, based on the first label information and the second label information, a matching relationship between the panoramic image of the at least one subspace and the 2D image of the at least one subspace, wherein, the performing 3D reconstruction on the panoramic image of the at least one subspace, and procuring a projection image corresponding to the panoramic image of the at least one subspace includes
        when the matching relationship between the panoramic image of the at least one subspace and the 2D image of the at least one subspace cannot be attained based on the first label information and the second label information, performing 3D reconstruction on the panoramic image of the at least one subspace, for which the matching relationship cannot be created, and procuring a projection image corresponding to the same panoramic image.

3. The image matching method in accordance with claim 1, wherein, the obtaining a panoramic image of at least one subspace in a 3D space includes
    making use of a panoramic camera to obtain a panoramic image of each subspace among the at least one subspace; or
    obtaining, based on a plurality of perspective images of each subspace among the at least one subspace, a panoramic image of the same subspace.

4. The image matching method in accordance with claim 1, wherein, the acquiring, based on the 2D image of the 3D space, a 2D image of the at least one subspace in the 3D space includes
    conducting semantic recognition with respect to each pixel point in the 2D image of the 3D space so as to obtain a recognition result; and
    carrying out, based on the recognition result, segmentation in regard to the 2D image of the 3D space so as to acquire a 2D image of the at least one subspace.

5. The image matching method in accordance with claim 1, wherein, the attaining, based on the projection image of the at least one subspace and the 2D image of the at least one subspace, a matching relationship between the panoramic image of the at least one subspace and the 2D image of the at least one subspace includes
    performing shape matching on the projection image of the at least one subspace and the 2D image of the at least one subspace so as to obtain a shape matching result, and establishing, based on the shape matching result, a matching relationship between the projection image of the at least one subspace and the 2D image of the at least one subspace; and
    acquiring, based on the matching relationship between the projection image of the at least one subspace and the 2D image of the at least one subspace, a matching relationship between the panoramic image of the at least one subspace and the 2D image of the at least one subspace.

6. An image matching apparatus comprising:
    a processor; and
    a storage storing computer-executable instructions, connected to the processor,
    wherein, the computer-executable instructions, when executed by the processor, cause the processor to perform the image matching method in accordance with claim 1.

7. A non-transitory computer-readable medium having computer-executable instructions for execution by a processor, wherein, the computer-executable instructions, when executed by the processor, cause the processor to conduct the image matching method in accordance with claim 1.

8. The image matching method in accordance with claim 1, wherein, the performing 3D reconstruction on the panoramic image of the at least one subspace includes attaining, based on the panoramic image of the at least one subspace, spatial features of at least one object forming the at least one subspace; and carrying out 3D reconstruction based on the spatial features of the at least one object so as to obtain a 3D reconstruction result.

9. The image matching method in accordance with claim 8, wherein, the procuring a projection image corresponding to the panoramic image of the at least one subspace includes performing detection and positioning on at least one target in the panoramic image of the at least one subspace so as to obtain a detection and positioning result; and procuring, based on the 3D reconstruction result as well as the detection and positioning result, a projection image of the at least one subspace, on a plane where the 2D image of the 3D space is located.

10. The image matching method in accordance with claim 9, wherein, the attaining, based on the projection image of the at least one subspace and the 2D image of the at least one subspace, a matching relationship between the panoramic image of the at least one subspace and the 2D image of the at least one subspace includes acquiring, based on a layout of objects and/or targets in the projection image of the at least one subspace and a layout of objects and/or targets in the 2D image of the at least one subspace, a matching relationship between the projection image of the at least one subspace and the 2D image of the at least one subspace; and attaining, based on the matching relationship between the projection image of the at least one subspace and the 2D image of the at least one subspace, a matching relationship between the panoramic image of the at least one subspace and the 2D image of the at least one subspace.

11. An image matching apparatus comprising:

an image obtainment part configured to obtain a panoramic image of at least one subspace in a 3D space and a 2D image of the 3D space, wherein, the 3D space consists of the at least one subspace, and when the 3D space is composed of a plurality of subspaces, the respective subspaces are not mutually overlapped;

a subspace acquisition part configured to acquire, based on the 2D image of the 3D space, a 2D image of the at least one subspace in the 3D space;

a reconstruction part configured to perform 3D reconstruction on the panoramic image of the at least one subspace, and procure a projection image corresponding to the panoramic image of the at least one subspace; and a matching part configured to attain, based on the projection image of the at least one subspace and the 2D image of the at least one subspace, a matching relationship between the panoramic image of the at least one subspace and the 2D image of the at least one subspace, and establish an association relationship between the panoramic image of the at least one subspace and the 2D image of the at least one subspace between which the matching relationship is generated.

12. The image matching apparatus in accordance with claim 11, further comprising:

a rough matching part configured to acquire first label information corresponding to the panoramic image of the at least one subspace in the 3D space;

acquire second label information corresponding to the 2D image of the at least one subspace in the 3D space; and attain, based on the first label information and the second label information, a matching relationship between the panoramic image of the at least one subspace and the 2D image of the at least one subspace, wherein, the reconstruction part is further configured to perform, when the matching relationship between the panoramic image of the at least one subspace and the 2D image of the at least one subspace cannot be attained based on the first label information and the second label information, 3D reconstruction on the panoramic image of the at least one subspace, for which the matching relationship cannot be created, and procure a projection image corresponding to the same panoramic image.

13. The image matching apparatus in accordance with claim 11, wherein, the image obtainment part is further configured to make use of a panoramic camera to obtain a panoramic image of each subspace among the at least one subspace; or obtain, based on a plurality of perspective images of each subspace among the at least one subspace, a panoramic image of the same subspace.

14. The image matching apparatus in accordance with claim 11, wherein, the subspace acquisition part is further configured to conduct semantic recognition with respect to each pixel point in the 2D image of the 3D space so as to obtain a recognition result; and carry out, based on the recognition result, segmentation in regard to the 2D image of the 3D space so as to acquire a 2D image of the at least one subspace.

15. The image matching apparatus in accordance with claim 11, wherein, the matching part is further configured to perform shape matching on the projection image of the at least one subspace and the 2D image of the at least one subspace so as to obtain a shape matching result, and establish, based on the shape matching result, a matching relationship between the projection image of the at least one subspace and the 2D image of the at least one subspace; and acquire, based on the matching relationship between the projection image of the at least one subspace and the 2D image of the at least one subspace, a matching relationship between the panoramic image of the at least one subspace and the 2D image of the at least one subspace.

16. The image matching apparatus in accordance with claim 11, wherein, the reconstruction part is further configured to attain, based on the panoramic image of the at least one subspace, spatial features of at least one object forming the at least one subspace; and carry out 3D reconstruction based on the spatial features of the at least one object so as to obtain a 3D reconstruction result.

17. The image matching apparatus in accordance with claim 16, wherein, the reconstruction part is further configured to perform detection and positioning on at least one target in the panoramic image of the at least one subspace so as to obtain a detection and positioning result; and procure, based on the 3D reconstruction result as well as the detection and positioning result, a projection image of the at least one subspace, on a plane where the 2D image of the 3D space is located.

18. The image matching apparatus in accordance with claim 17, wherein, the matching part is further configured to
- acquire, based on a layout of objects and/or targets in the projection image of the at least one subspace and a layout of objects and/or targets in the 2D image of the at least one subspace, a matching relationship between the projection image of the at least one subspace and the 2D image of the at least one subspace; and
- attain, based on the matching relationship between the projection image of the at least one subspace and the 2D image of the at least one subspace, a matching relationship between the panoramic image of the at least one subspace and the 2D image of the at least one subspace.

* * * * *